United States Patent [19]

Hayden et al.

[11] Patent Number: 5,368,355
[45] Date of Patent: Nov. 29, 1994

[54] VEHICLE SEAT HAVING NORMAL USAGE AND STORAGE POSITIONS

[75] Inventors: Richard A. Hayden, Troy; James A. Melchert, Auburn Hills, both of Mich.; Charles A. Phaneuf, Windsor, Canada

[73] Assignee: General Motors Corporation, Detroit, Mich.

[21] Appl. No.: 130,812

[22] Filed: Oct. 4, 1993

[51] Int. Cl.$^5$ .............................................. B60N 2/02
[52] U.S. Cl. ................. 296/65.1; 297/378.12; 297/378.14; 248/429
[58] Field of Search .................. 296/65.1, 69; 297/341, 297/378.12, 378.14; 248/429

[56] References Cited

U.S. PATENT DOCUMENTS

| | | | |
|---|---|---|---|
| 3,931,995 | 1/1976 | Arai | 297/341 |
| 3,973,799 | 8/1976 | Berg | 297/341 |
| 4,919,482 | 4/1990 | Landis et al. | 297/378.14 X |
| 5,106,144 | 4/1992 | Hayakawa et al. | 296/68.1 |

*Primary Examiner*—Dennis H. Pedder
*Attorney, Agent, or Firm*—Ernest E. Helms

[57] ABSTRACT

An arrangement for a vehicle seat for connection with the floor of a vehicle is provided which, in a preferred embodiment, includes two generally parallel rails extending within the vehicle being connected with the vehicle floor, the rails having associated therewith a locking plate having first and second unique openings, a seat bun frame mounted with relative means of travel with respect to the two rails, a seatback pivotally mounted with respect to the seat bun frame, the seatback having upright and folded down positions, a first locking pin operatively associated with the first lock plate openings for selectively setting the position of the seat bun frame with respect to the rails, a second locking pin operatively associated with the second openings for selectively setting the position of the seat bun frame with respect to the rails, a first release handle for releasing the first and second locking pins from engagement with the lock plate, a first lock-out for preventing the actuation of the first release lever unless the seatback is in a folded down position, and a second lock preventing the movement of the seatback from a folded position to an upright position unless the first and second lock pins are engaged with the lock plate, affixing the position of the seat bun frame with respect to the rails.

6 Claims, 3 Drawing Sheets

VEHICLE SEAT HAVING NORMAL USAGE AND STORAGE POSITIONS

FIELD OF THE INVENTION

The field of the present invention is that of vehicle seating. More particularly, the field of the present invention is that of bench-type seats for van-type vehicles and a method of utilization thereof.

BACKGROUND OF THE INVENTION

It is known to provide bench seating in van-type vehicles. So that the seat belt may be anchored to the bench seat itself, most van-type vehicles have bench seats which are bolted down to the vehicle floor. It would be more desirable to have van-type vehicles wherein the bench seat could be moved from its normal seating position to a storage position wherein the seatback was pivoted downward to provide more space.

SUMMARY OF THE INVENTION

To meet the above-noted desires and to provide other advantages over prior alternative designs, the present invention is brought forth. The present invention provides an arrangement of a seat having upright and storage positions in a van-type vehicle. Restraint belt mechanisms may be directly attached to a seat of the present invention.

DESCRIPTION OF THE PREFERRED EMBODIMENT

Figure 1:
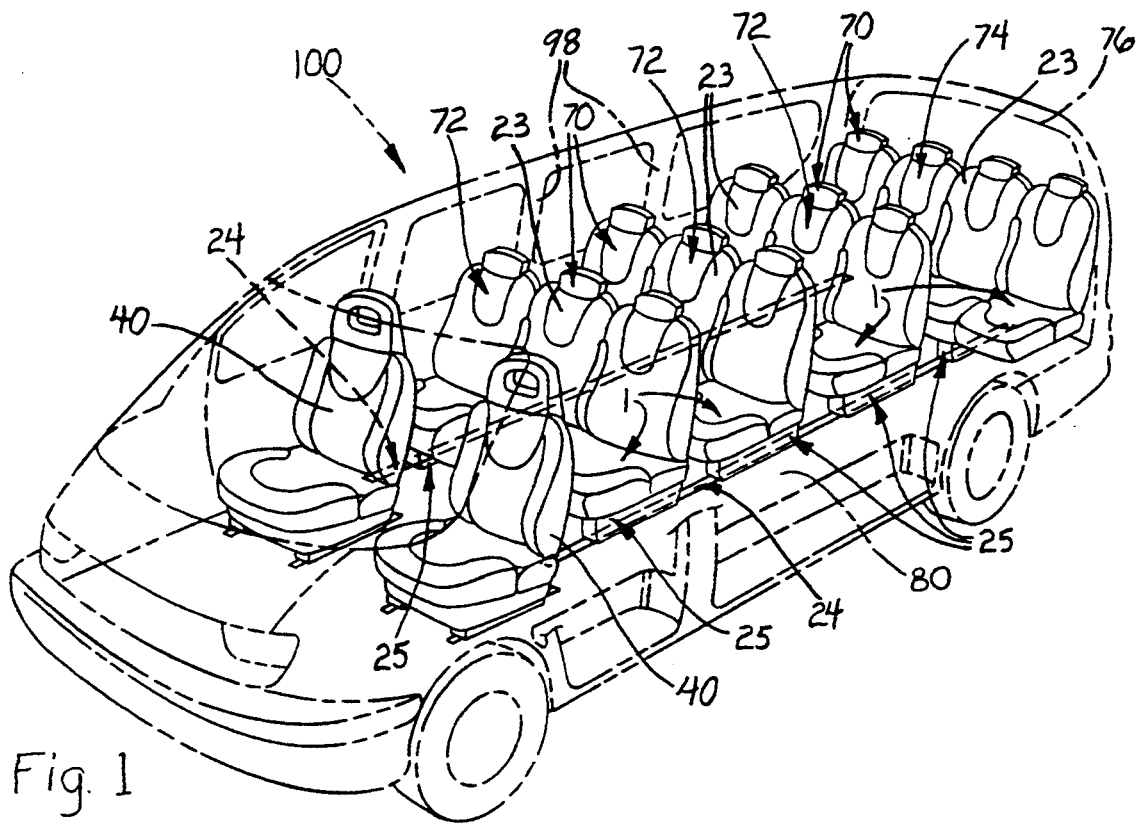
FIG. 1 is a perspective view of a preferred embodiment seat according to the present invention shown in an environment of a van-type vehicle.
Figure 2:
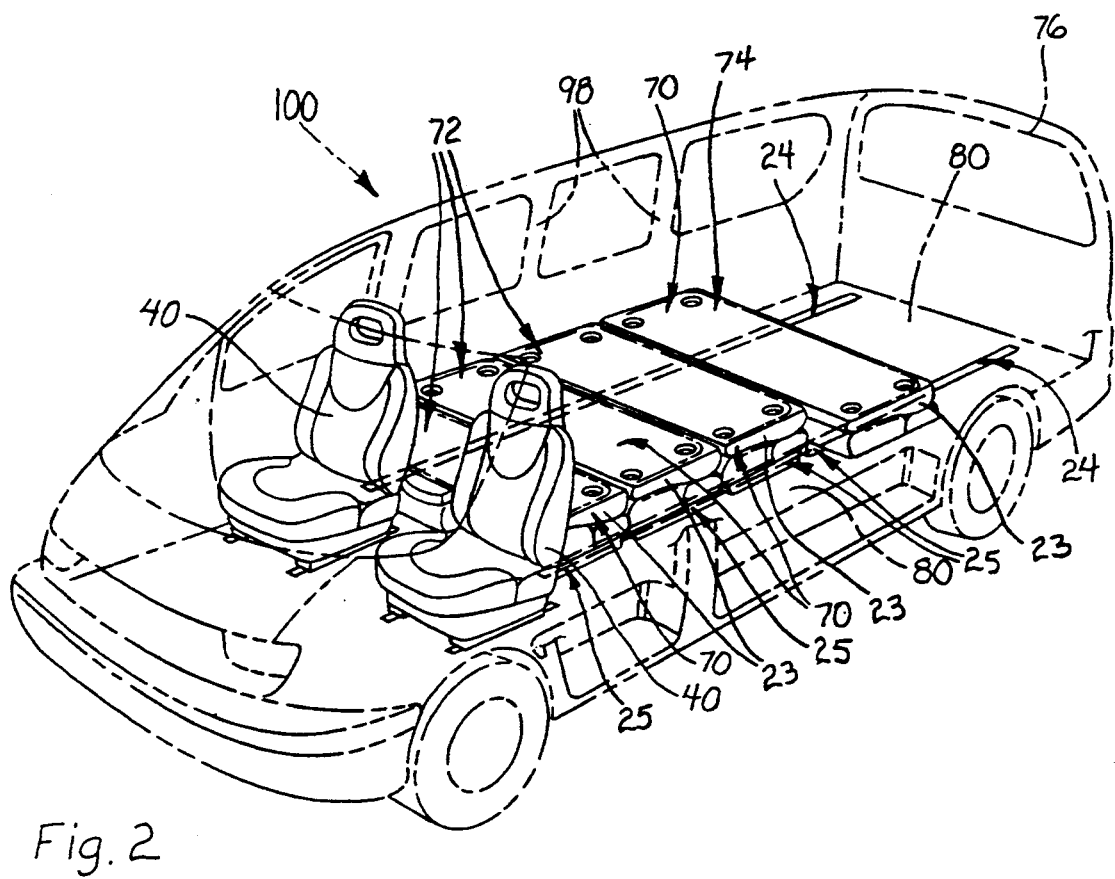
FIG. 2 is a perspective view similar to that of FIG. 1 showing the seating arrangement of the present invention in a storage position.
Figure 3:
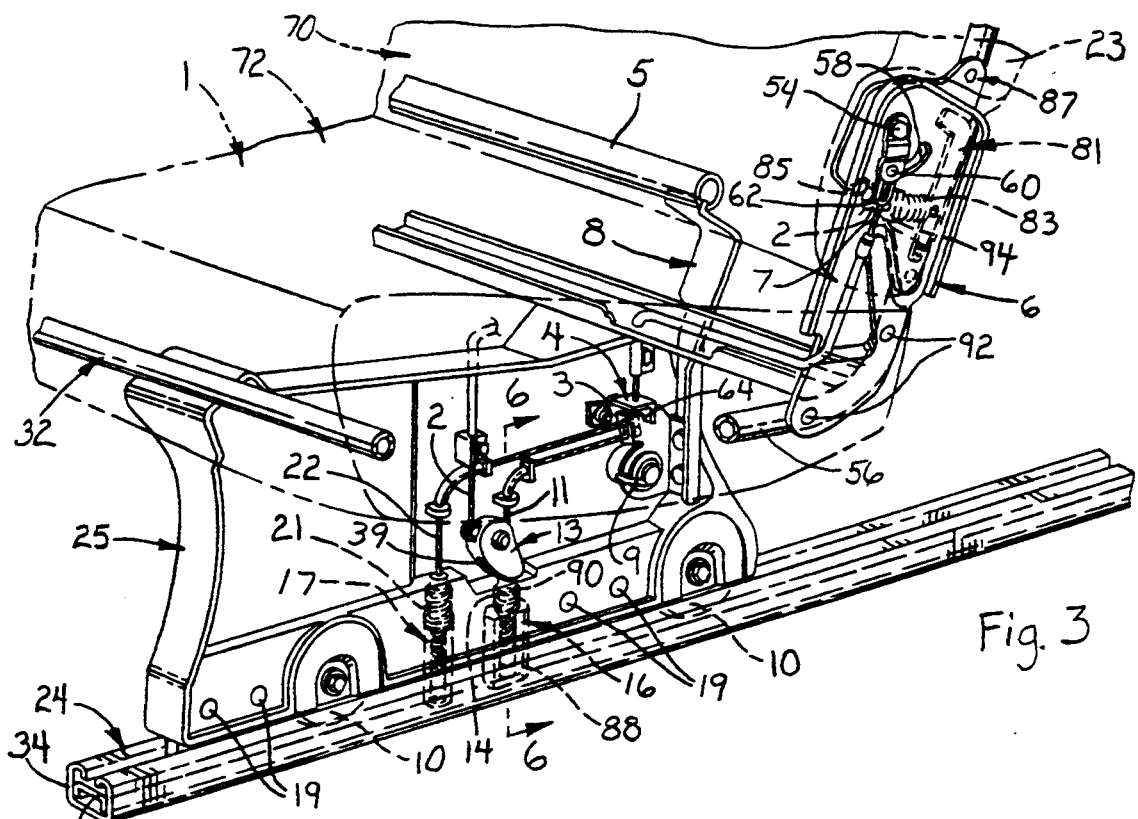
FIG. 3 is a perspective view of a portion of a seat according to the present invention shown in FIGS. 1 and 2.

Referring to FIGS. 1, 2 and 3, the inventive seating arrangement 70 according to the present invention is shown in the environment of an interior of a van-type vehicle 100. The van-type vehicle 100 has two front row seats 40 and four bench-type seat sets 70, including three three-abreast seat sets 72 and one four-abreast bench seat 74. The seats 74, 72 have seatbacks 23 which are upholstered to give an appearance of individual bucket seats instead of bench seating. In the storage position as shown in FIG. 2, the bench seats 72 and 74 have their seatbacks 23 folded over, and each respective bench seat has been moved forwardly to its storage position to allow a generally flat storage bed and to create as much room adjacent a rear cargo door 76 as possible.

Referring additionally to FIGS. 3 through 6, the bench seat 70 according to the present invention has a seat cushion 1. The seat cushion 1 is joined with a seat cushion or bun frame 32. The frame 32 is fixably connected with two spaced-apart riser assemblies 25 (only one shown in FIGS. 3 through 6). Each riser assembly 25 is mounted for relative movement in a respective track or rail assembly 24. There are two track assemblies 24 which extend along a floor 80 of the vehicle. The track assembly has a C-channel 34 (FIG. 6) which juxtaposes between its two side walls a lock plate member 36. The lock plate member 36 will have a series of openings with two different unique sizes and/or shapes whose functions will be later described. Preferably, the riser assemblies 25 will be essentially identical to one another. Therefore, in the interest of brevity, only one riser assembly 25 will be described.

The riser assembly 25 is mounted for relative movement within the rail 24 by front and rear wheels 10. The rail 24 has a curled-in portion 38 which interlocks with a double-sided J-channel 82 connected with the riser 25. The inverted J-channel 82 is connected to the riser assembly 25 by pins 19. If desired, the wheels 10 can be elastomeric and a teflon slider (not shown) may be placed on a top surface 42 of a slider portion of the J-channel to interlock with the turned-in portion 38 of the rails to place the wheels 10 in compression to reduce or eliminate chucking (vibration of the seat experienced when loading). In an accident situation, the top portion 42 of the J-channel 82 will engage with the pocket form by the inward-directed flange 38 of the rail to prevent the movement of the riser assembly 25 from the rails 24, even under loading experience by a restraint belt directly connected with the seat assembly 70.

A first or seating position pin 16 is spring biased downward by a seating position return spring 14 into a generally large opening 44 in the lock plate member 36. The seating position pin 16 which is slidably mounted in the vertical orientation with respect to the riser assembly 25 sets the position of the riser assembly with respect to the rail 24 in the normal seating position. Although only one seating position pin 16 is required, typically it will be preferable that the opposite side riser 25 (not shown) will have an identical seating-type position pin 16.

The pin 16 is controlled by a cable 11. A bullet 84 is crimped on the end of the cable 11. The bullet is slidably mounted in a bore 86 formed in a lower section 88 of the pin 16. A cable tensioner spring 18 is used to remove any slackness in the cable 11 due to assembly tolerances or operational wear.

The pin cable 11 is connected with a pivot handle 8 having a grip 5. An upper section 90 of the seating position pin acts upon a cam follower 13. The cam follower 13 has a slot 39 to allow for passage of the seating position pin cable 11. The cam follower 13 is torsionally biased by a torsion spring 12 and has a pivotal axis coterminous with the center of the torsion spring 12.

When the seat 70 is in the seated position (FIG. 3), additionally a second smaller storage position pin 17 is operatively associated with a smaller opening 50 (FIG. 4) in the lock plate member 36. Preferentially, the shape and/or size of the opening 50 will be such that the seating position pin 16 cannot engage with the opening 50, even if placed directly above it. The storage pin has a cable tensioning and engagement biasing spring in like manner to the pin 16.

The pin 17 can be pulled from its actuated position against the biasing of its return spring 21 by a pull on the storage position pin cable 22. Both cables 22 and 11 are connected with the pivot handle 8. The pivot handle 8 is biased to a nonactuated position (counterclockwise direction) by a torsion spring 9. A pull on the grip 5 allows both of the pins 17 and 16 to be removed from their respective openings.

The seatback 23 is pivotally mounted by a pin 54 having a hex head to the seatback hinge 6. The seatback hinge 6 is attached by rivets 92 or other suitable fastener means to a tube 56 of bun frame 32, which is in turn connected with the riser assembly 25.

Figure 4:
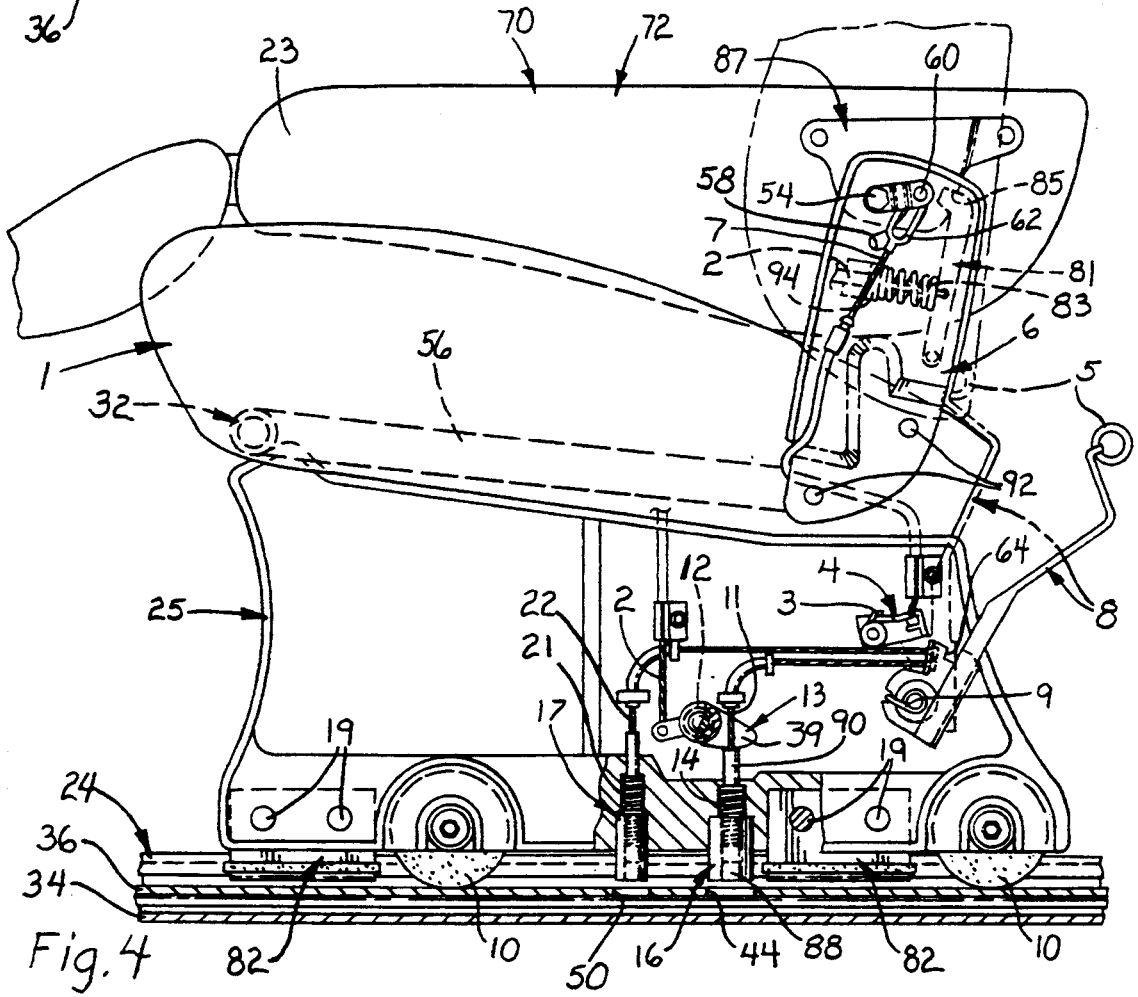
FIGS. 4 and 5 are side elevational views of the seat shown in FIG. 3, demonstrating different stages of operation of the present invention.
Figure 6:
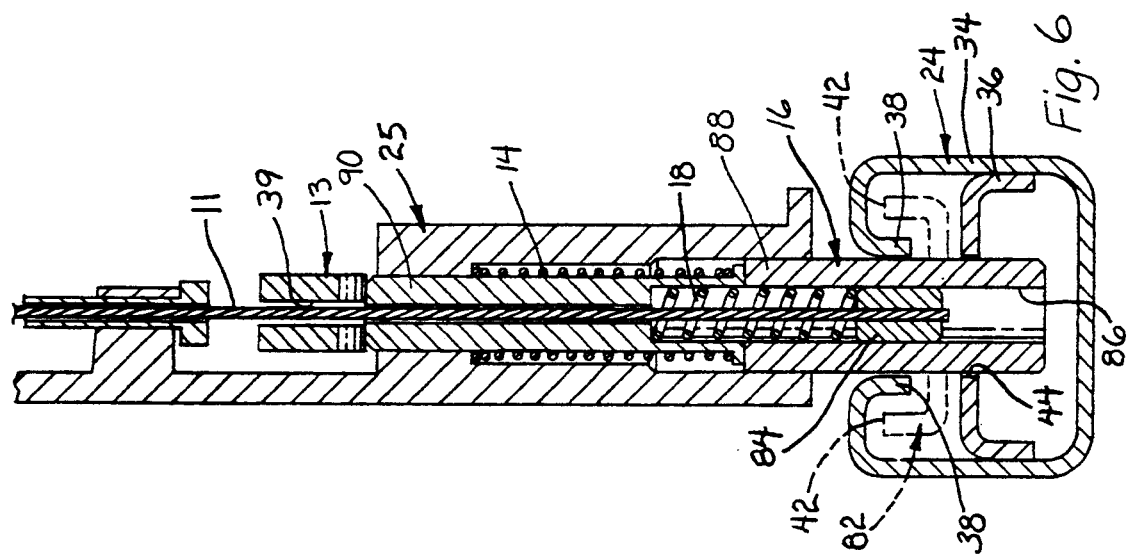
FIG. 6 is a view taken along line 6—6 of FIG. 3.
Figure 5:
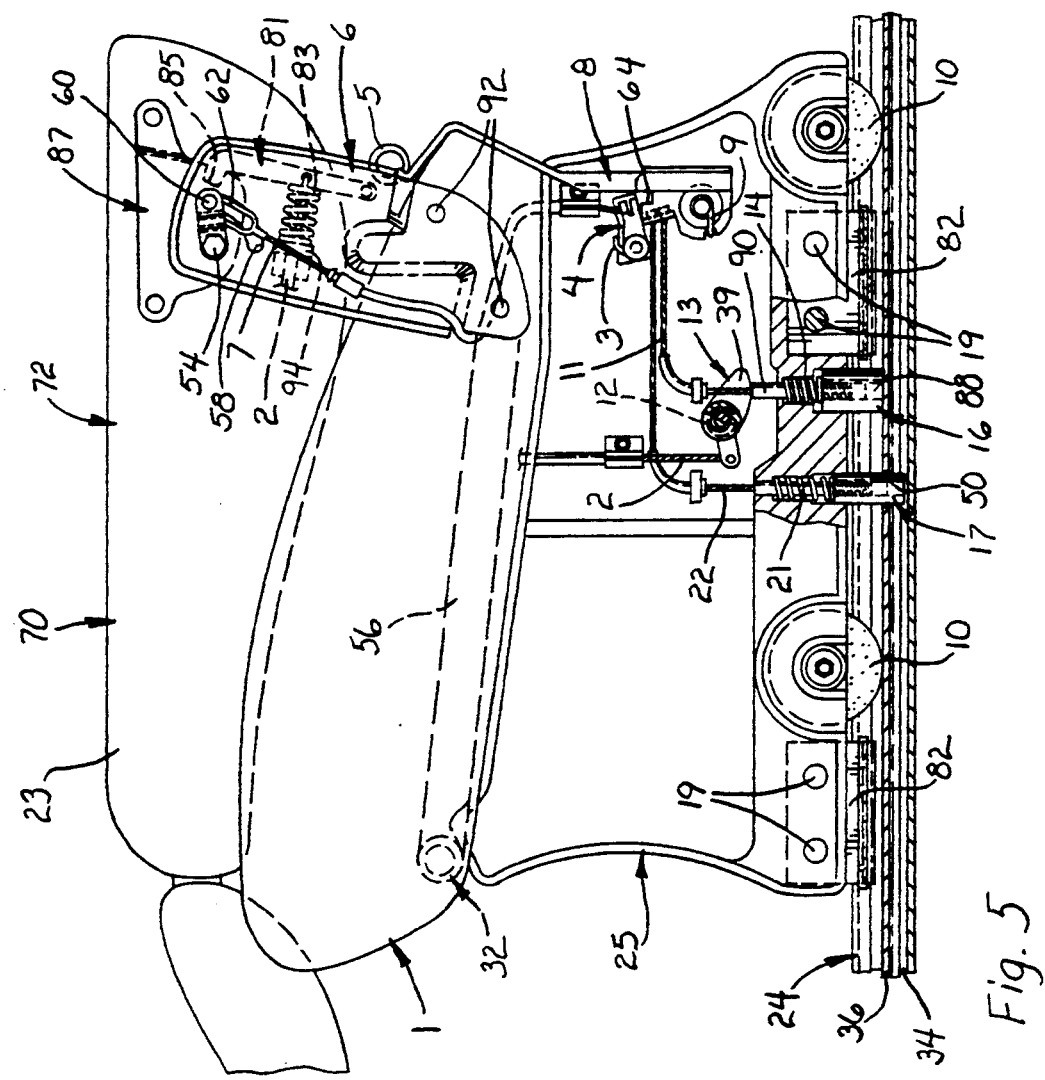

The hinge 6 has a cam slot 58 which guides the travel of a pin 60. The pin 60 is connected with a clevis 62, which is in turn connected with a handle lockout cable 7. The handle lockout cable is connected with a lock handle 4 which is biased by torsion spring 3 in a locking (as shown in FIGS. 3 and 4) clockwise direction orientation within a slot 64 of the pivot handle 8. Therefore, the pivot handle 8 cannot be pulled unless the seatback 23 has been pivoted downwardly into its storage position, causing the pin 60 to be pulled in the slot 58, tensioning the cable 7 and lifting the lock 4 out of the lockout handle slot 64. Therefore, when the bench seat 70 is in the seating position, it cannot be moved to a storage position unless the seatback 23 is first folded over. In an embodiment not shown, another lock is provided to prevent the folding down of the seatback 23 unless a separate lever is first actuated.

A seatback lockout cable 2 is connected with the cam follower 13. The seatback lockout cable 2 is routed to connect with a lever 81 pivotally mounted on the hinge plate 6. The lever 81 captures a spring 83 between itself and a washer 94 welded to the bracket 6. The spring 83 therefore causes the lever 81 to rotate in a clockwise direction away from an indention 85 in a seatback plate 87. When the cam 13 is pivoted counterclockwise by virtue of a pull on grip 5, the lockout cable 2 is tensioned, pulling the lever 81 into engagement with the indention 85 and the seatback plate 87. The result of the above is that once the seatback 23 is pivoted downwardly, pulling on the grip 5 locks the seatback 23 in its folded position. If the pin 16 is removed from its opening 44, the movement of the cam 13 will cause the seatback 23 to be locked in its folded down position until such time as pin 16 re-enters a seating position opening 44.

In operation, in its seating position the seatback 23 will be folded upward and the seat positioning pin 16 will be in its respective opening 44 and the storage position pin 17 will be in its opening 50. The seat 70 will be locked in position, and in a crash situation, the front and rear J-channels 2 will prevent the riser assembly 25 from leaving the rail 24. Therefore, the restraint belt can be attached directly to the seat. Typically, the opening 44 will be in such a position that the seat 70 can only be located in those positions which are adjacent the anchorage for a shoulder strap-type restraint belt (not shown) which would attach on one of the pillars 98 of the van. To move the seat 70 to its storage position, the seatback 23 must first be pivoted to a forward position, thereby removing the lock 4 and allowing the grip 5 to be manually pulled to remove the seating position and storage position pins 16 and 17. The seat 70 is then free to be slid forwardly, and the seatback 23 will be locked in its down position by virtue of the lever 81 which has been pulled to a locking position by the cam 13, which was raised by the prior action of the grip 5. At such time as an appropriate storage position is reached, the pin 17 will automatically, by its spring bias, pop into place an opening 50. The locking plate 36 is made in such a manner that the bench seats 72, 74 cumulatively move forwardly to a storage position opening 50 for their respective storage pins. However, since the pin 16 is too large for the other storage opening 50, it cannot reinsert itself into the locking plate 36. Typically, the alignment of the openings 50 will be such that no seat will go past another storage position pin opening 50. In the storage position, the seatback 23 cannot be raised to its raised position as previously mentioned since the pin 16 is not engaged. Therefore, no one can utilize the seat 70 when it is away from its proper seating position orientation adjacent a shoulder restraint anchoring location.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement for a vehicle seat connected to the floor of a vehicle comprising:
    a rail means extending within the vehicle being connected to the vehicle floor, the rail means having a locking plate means;
    a seat bun frame means mounted for relative travel with respect to the rail means;
    a seatback means pivotally mounted with respect to the seat bun frame means, having upright and folded down positions;
    first locking pin means operatively associated with the locking plate means for selectively setting the position of the seat bun frame means with respect to the rail means;
    second locking pin means operatively associated with the locking plate means for selectively setting the position of the seat bun frame means with respect to the rail means;
    first release means for releasing the first and second locking pin means from the locking plate means;
    means preventing the activation of the first release means unless the seatback means is in a folded down position; and
    means preventing the movement of the seatback means from the folded down position to the upright position unless the first locking pin means is engaged with the lock plate means, affixing the position of the seat bun frame means with respect to the rail means.

2. A seating arrangement as described in claim, 1 wherein the seat has a storage position wherein only the second locking pin means is engaged with the locking plate means and wherein the seat has a seating position wherein the first and second pin means are both engaged with the lock plate means.

3. A seating arrangement as described in claim 2 wherein the locking plate means has a first unique notch for the first locking plate means and a second unique notch for the second locking pin means.

4. A seating arrangement as described in claim 1 wherein the first and second locking pin means are spring loaded with the lock plate means.

5. An arrangement for a vehicle seat for connection with the floor of a vehicle comprising:
    two generally parallel rails extending within the vehicle being connected with the vehicle floor, the rails having associated therewith a locking plate having first and second unique openings;

a seat bun frame mounted with relative means of travel with respect to the two rails;

a seatback pivotally mounted with respect to the seat bun frame, the seatback having upright and folded down positions;

a first locking pin operatively associated with the first lock plate openings for selectively setting the position of the seat bun frame with respect to the rails:

a second locking pin operatively associated with the second openings for selectively setting the position of the seat bun frame with respect to the rails;

a first release handle for releasing the first and second locking pins from engagement with the lock plate;

first lock-out means for preventing the actuation of the first release handle unless the seatback is in a folded down position; and second lock means preventing the movement of the seatback from a folded position to an upright position unless the first and second lock pins are engaged with the lock plate, affixing the position of the seat bun frame with respect to the rails.

6. A method of arranging a seat along the floor of a vehicle having at least one normal seating position and at least one storage position, the method comprising:

extending within the vehicle a rail having a lock plate means and connecting the rail with the vehicle floor;

mounting for relative movement with respect to the rail a seat bun frame;

pivotally mounting with respect to the seat bun frame a seatback having upright and folded positions;

selectively setting the seat bun Irame in the normal seating position with a first locking pin which is operatively associated with the lock plate;

selectively setting the position of the seat bun frame with respect to the rail in the storage position with a second locking pin operatively associated with the lock plate means;

releasing the first and second lock pins from the lock plate by pulling on a handle;

means preventing the movement of the handle unless the seatback is in a folded down position; and means preventing the movement of the seatback from a folded position to an upright position unless the first lock pin is engaged with the first lock plate, setting the position of the seat bun frame in the normal seating position.

* * * * *